United States Patent
Krueger et al.

(10) Patent No.: US 11,499,678 B2
(45) Date of Patent: Nov. 15, 2022

(54) SYSTEM, METHOD AND APPARATUS FOR MODULAR, MOBILE RAIL FUELING

(71) Applicant: BNSF Railway Company, Fort Worth, TX (US)

(72) Inventors: Darrell Krueger, Lawrence, KS (US); Joshua Soles, Calgary (CA)

(73) Assignee: BNSF Railway Company, Fort Worth, TX (US)

(*) Notice: Subject to any disclaimer, the term of this patent is extended or adjusted under 35 U.S.C. 154(b) by 259 days.

(21) Appl. No.: 15/665,904

(22) Filed: Aug. 1, 2017

(65) Prior Publication Data

US 2019/0041004 A1    Feb. 7, 2019

(51) Int. Cl.
*F17C 9/00* (2006.01)
*F17C 6/00* (2006.01)
(Continued)

(52) U.S. Cl.
CPC .................. *F17C 6/00* (2013.01); *F17C 7/02* (2013.01); *F17C 9/00* (2013.01); *F17C 13/005* (2013.01); *F17C 13/04* (2013.01); *F17C 13/083* (2013.01); F17C 2201/0104 (2013.01); F17C 2201/019 (2013.01); F17C 2201/035 (2013.01); F17C 2201/054 (2013.01); F17C 2203/0391 (2013.01); F17C 2205/0107 (2013.01); F17C 2205/0126 (2013.01); F17C 2205/0157 (2013.01); F17C 2205/0323 (2013.01); F17C 2221/012 (2013.01); F17C 2221/033 (2013.01); F17C 2221/035 (2013.01);
(Continued)

(58) Field of Classification Search
CPC ........ F17C 9/00; F17C 9/02; F17C 2221/032; F17C 2221/033; F17C 2221/035; F17C 2225/0123; F17C 2270/01; F17C 2270/0165; F17C 5/02; F17C 2227/047; F17C 2250/061; F17C 2250/075; F17C 13/08; F17C 13/083; B61D 5/004; B61D 5/04; B61D 5/06
See application file for complete search history.

(56) References Cited

U.S. PATENT DOCUMENTS 4,098,426 A * 7/1978 Gerhard ................ F17C 13/083
                                                          220/592.2
4,422,485 A   12/1983 O'Shea et al.
(Continued)

*Primary Examiner* — Miguel A Diaz
*Assistant Examiner* — Erik Mendoza-Wilkenfel
(74) *Attorney, Agent, or Firm* — Enrique Sanchez; Whitaker Chalk Swindle & Schwartz, PLLC

(57) ABSTRACT

A portable, modular fueling system for the storage, dispensing and offloading of fuel from a rail vehicle to one or more other fuel storage vessels is disclosed. The system module is self-contained on an ISO standardized intermodal platform. The module is capable of being in fluid communication with a plurality of modular storage vessels, either rail-bound or wayside, such as for delivering fuel to a fuel tender or a locomotive. Electrical power, equipment storage, lighting, and compressed air may be located on the intermodal rail car or in a support module, such as either ground-based or rail-mobile. Alternatively, the platform can be mounted to a trailer chassis, or affixed to a land-based foundation matching the standardized intermodal container footprint. Control of the fuel system is provided by automatic means with manual override.

17 Claims, 8 Drawing Sheets

(51) Int. Cl.
*F17C 7/02* (2006.01)
*F17C 13/00* (2006.01)
*F17C 13/04* (2006.01)
*F17C 13/08* (2006.01)

(52) U.S. Cl.
CPC ........... *F17C 2223/0123* (2013.01); *F17C 2223/0153* (2013.01); *F17C 2223/0161* (2013.01); *F17C 2223/033* (2013.01); *F17C 2223/035* (2013.01); *F17C 2225/0161* (2013.01); *F17C 2225/033* (2013.01); *F17C 2225/044* (2013.01); *F17C 2227/0341* (2013.01); *F17C 2250/01* (2013.01); *F17C 2250/03* (2013.01); *F17C 2265/065* (2013.01); *F17C 2270/0168* (2013.01); *F17C 2270/0173* (2013.01)

(56) References Cited

U.S. PATENT DOCUMENTS

| | | | | |
|---|---|---|---|---|
| 4,960,222 A * | 10/1990 | Fields, III | ............... | B65D 90/24 220/571 |
| 5,107,772 A * | 4/1992 | Viens | ............... | B61D 3/12 105/159 |
| 5,360,139 A * | 11/1994 | Goode | ............... | F17C 5/007 222/64 |
| 5,386,845 A * | 2/1995 | Zink | ............... | B60P 3/224 137/350 |
| 5,682,750 A * | 11/1997 | Preston | ............... | F17C 9/00 62/50.2 |
| 5,711,456 A * | 1/1998 | Bryant | ............... | B60S 5/02 222/40 |
| 5,752,617 A * | 5/1998 | Yung | ............... | B65D 90/24 220/4.12 |
| 5,878,767 A | 3/1999 | Etling et al. | | |
| 5,884,709 A * | 3/1999 | Evans | ............... | A62C 3/06 169/46 |
| 5,954,101 A * | 9/1999 | Drube | ............... | F17C 13/04 141/82 |
| 8,393,860 B2 | 3/2013 | Czechowski et al. | | |
| 8,925,470 B2 * | 1/2015 | Hart | ............... | F16M 3/00 108/55.1 |
| 2002/0079016 A1 * | 6/2002 | Webb | ............... | B67D 7/78 141/2 |
| 2004/0250871 A1 | 12/2004 | Bingham et al. | | |
| 2006/0156742 A1 * | 7/2006 | Farese | ............... | F17C 5/06 62/50.2 |
| 2010/0320727 A1 * | 12/2010 | Haut | ............... | B62D 21/20 280/414.5 |
| 2014/0202583 A1 * | 7/2014 | Lee | ............... | B67D 7/04 141/82 |
| 2014/0299101 A1 * | 10/2014 | Melanson | ............... | F02M 21/0221 123/445 |
| 2015/0136043 A1 * | 5/2015 | Shaaban | ............... | F17C 7/04 122/31.1 |
| 2015/0303770 A1 | 10/2015 | Beissler et al. | | |
| 2015/0338858 A1 * | 11/2015 | Bates | ............... | B60P 3/20 62/56 |
| 2016/0195221 A1 * | 7/2016 | Roberts | ............... | F17C 7/02 222/372 |
| 2017/0023180 A1 * | 1/2017 | Petit | ............... | F17C 7/00 |
| 2018/0079347 A1 | 3/2018 | Ellis et al. | | |

* cited by examiner

SYSTEM, METHOD AND APPARATUS FOR MODULAR, MOBILE RAIL FUELING

BACKGROUND OF THE INVENTION

Field of the Disclosure

The present invention relates in general to fueling vehicles and, in particular, to a system, method and apparatus for modular, mobile rail fueling.

Description of the Prior Art

Liquid natural gas (LNG) refueling technology is well established for road vehicles and marine vessels. Numerous vendors provide equipment for mobile refueling from a road-going transport, stationary fueling in a service area or dock/port. Current refueling of LNG rail vehicles is performed from on-road transports either through differential pressure transfer or pump transfer. Widespread use of LNG as a fuel in the rail industry requires a mixture of fixed fueling facilities and mobile refueling from on-road transports. Current industry offerings do not address the needs of growing LNG use in the rail industry.

Railroad fueling infrastructure, and specifically LNG fueling infrastructure, requires significant capital investment. LNG is presently an alternative fuel, not having been adopted in widespread use for rail applications, and is not readily available in most parts of the country. The present North American fuel market presents areas of the continent where LNG is not currently economical for rail use, and areas where LNG is the most economic fuel for rail use.

Specific issues to further adoption of LNG for rail use include weight restrictions for on-road transports require multiple deliveries of LNG to fuel single LNG locomotives or LNG fuel tenders. In addition, the inaccuracy of level detection systems means some LNG is "backhauled" by on-road transports if the tender has more LNG onboard than reported. Transports typically do not have the power or pump capacity to fill at flow rates near those of current diesel "fuel pad" flow rates. Moreover, there are no automatic refueling controls for rail vehicles on the market, so LNG refueling requires technically skilled labor to complete refueling operations. Construction of fixed refueling infrastructure requires large capital expense and is incapable of being repositioned if market conditions change. Given the large potential impact to railroad operations, existing fueling locations may not be ideal for LNG. Thus, improvements in LNG fueling continue to be of interest.

SUMMARY

Embodiments of a system, method and apparatus for modular, mobile rail fueling are disclosed. For example, a system for portable, modular fueling includes a platform configured for intermodal rail transport. The platform has a storage tank for fuel and mounted to a frame. The storage tank is configured to be in fluid communication with one or more storage vessels for fuel to deliver fuel thereto.

In another embodiment, an apparatus for portable, modular LNG fueling includes an intermodal well rail car having an intermodal foot print. The intermodal well rail car is configured to provide an on-board fuel dispensing system, power, storage, lighting and compressed air. The apparatus also may include a platform contained in the intermodal foot print and mounted to the intermodal well rail car for intermodal rail transport. The platform has a cryogenic storage tank mounted to a frame, and is configured to handle LNG in both gaseous and liquid states with one or more LNG storage vessels to deliver LNG fuel thereto.

An embodiment of a method of LNG fueling includes providing a portable platform having a cryogenic storage tank with LNG fuel. The method also includes mounting the portable platform to a footprint of an intermodal well rail car. The method may further include providing at least one of power, storage, lighting or compressed air from the intermodal well rail car to the portable platform. In addition, the method includes delivering LNG fuel to one or more LNG storage vessels.

The foregoing and other objects and advantages of these embodiments will be apparent to those of ordinary skill in the art in view of the following detailed description, taken in conjunction with the appended claims and the accompanying drawings.

BRIEF DESCRIPTION OF THE DRAWINGS

So that the manner in which the features and advantages of the embodiments are attained and can be understood in more detail, a more particular description may be had by reference to the embodiments thereof that are illustrated in the appended drawings. However, the drawings illustrate only some embodiments and therefore are not to be considered limiting in scope as there may be other equally effective embodiments.

The use of the same reference symbols in different drawings indicates similar or identical items.

DETAILED DESCRIPTION

Figure 1:
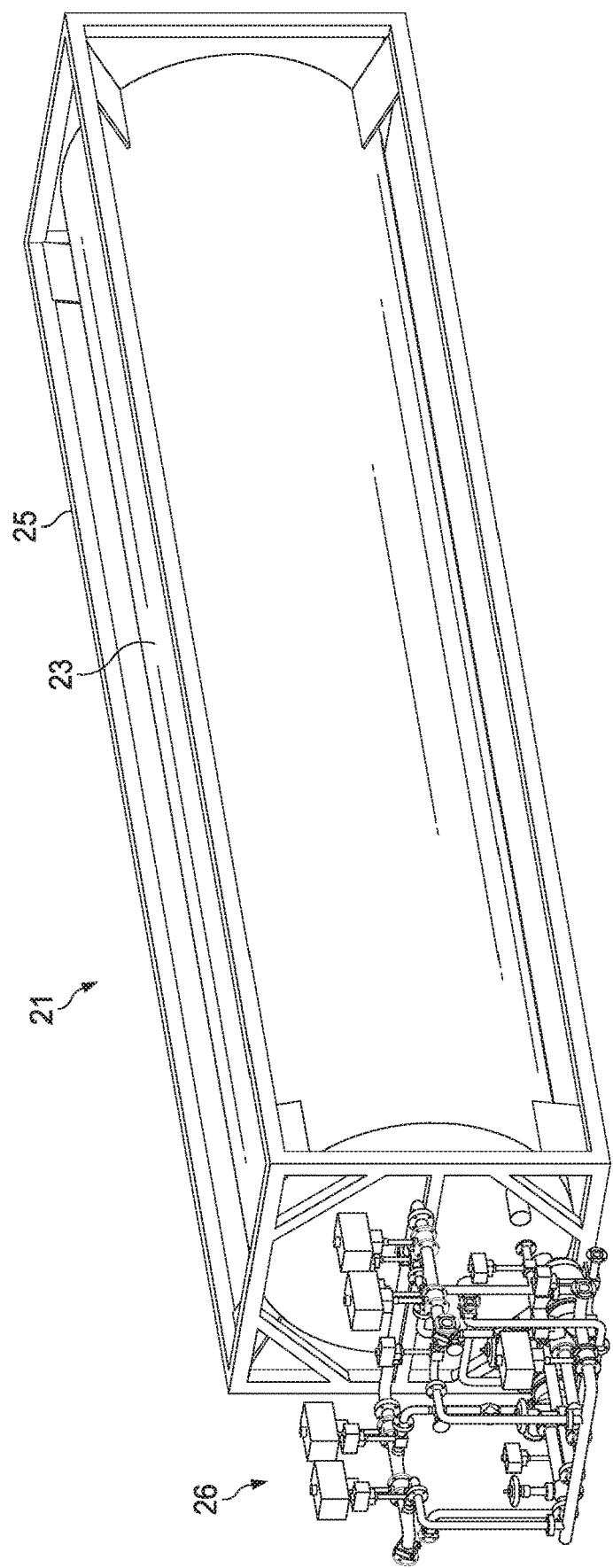
FIG. 1 is an isometric view of an embodiment of a fueling platform.

Embodiments of a system, method and apparatus for modular, mobile rail fueling are disclosed. For example, FIG. 1 depicts one version of a system for portable, modular fueling operations. Embodiments of the system include a platform 21 that is configured for standardized intermodal transport, such as intermodal rail transport. As used herein, the term "intermodal transport" involves the transportation of freight in an intermodal container or vehicle, using one or more modes of transportation (e.g., rail, ship, truck, etc.), without any handling of the freight itself when changing modes. In the examples given herein, the freight is fuel, which can be any one of liquid natural gas (LNG), compressed natural gas (CNG), diesel, gasoline, liquid hydrogen, liquid ethylene, propane, natural gas, heavy fuel oil, butane, ethane, acetylene, methanol, ethanol, diethyl ether or biodiesel. Versions of the system may be configured to handle fuel that is in both a gaseous state and a liquid state. Currently, federal law has not approved LNG as a transportable commodity and does not permit the transportation of LNG by rail. In other words, current LNG storage units are empty when moved by rail and are filled with LNG once established at assigned locations. However, the Association of American Railroads (AAR) has published but not yet officially adopted AAR M-1004 regarding LNG.

Figure 4:
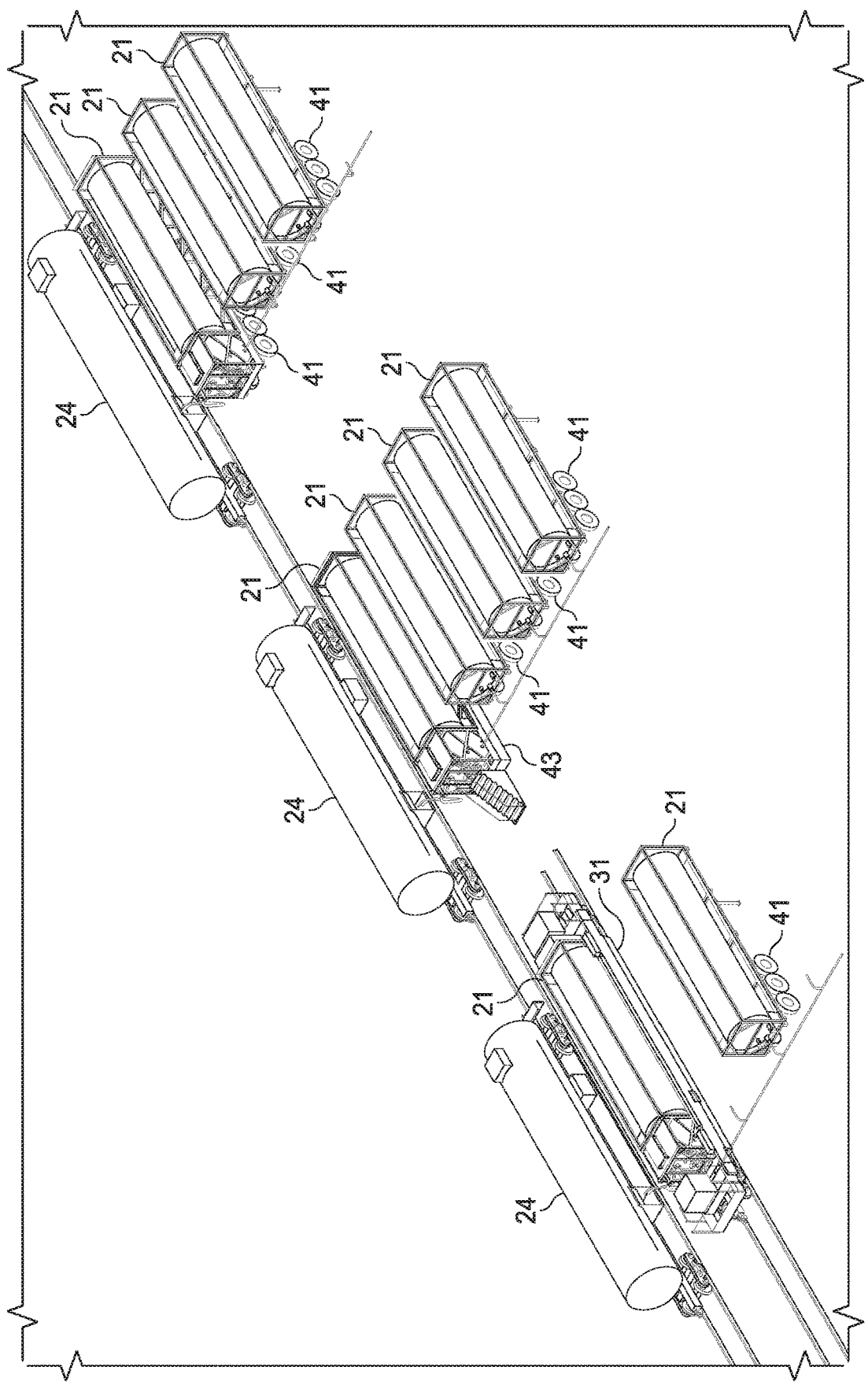
FIG. 4 is an isometric view of the embodiment of FIG. 3 during a refueling operation with one or more storage vessels.

In some examples, the platform 21 includes a storage tank 23 mounted to a frame 25. Versions of the storage tank 23 may include a standard, 40 foot or 48 foot ISO cryogenic tank frame mounted to the platform 21. The storage tank 23 may be configured to be self-contained and in fluid communication with one or more storage vessels (see, e.g., FIG. 4) to deliver fuel thereto and/or receive fuel therefrom. Examples of the one or more storage vessels may include at least one of a locomotive, fuel tender 24, a road vehicle, a marine vessel, a permanent or a land-fixed storage vessel, rubber-tired storage vessel, freight truck (see, e.g., trailer 41), passenger bus, light car, truck, mining truck or equipment, aircraft or another platform 21. The platform 21 also may include a detachable fuel dispensing system 26, which will be further described herein.

Figure 2:
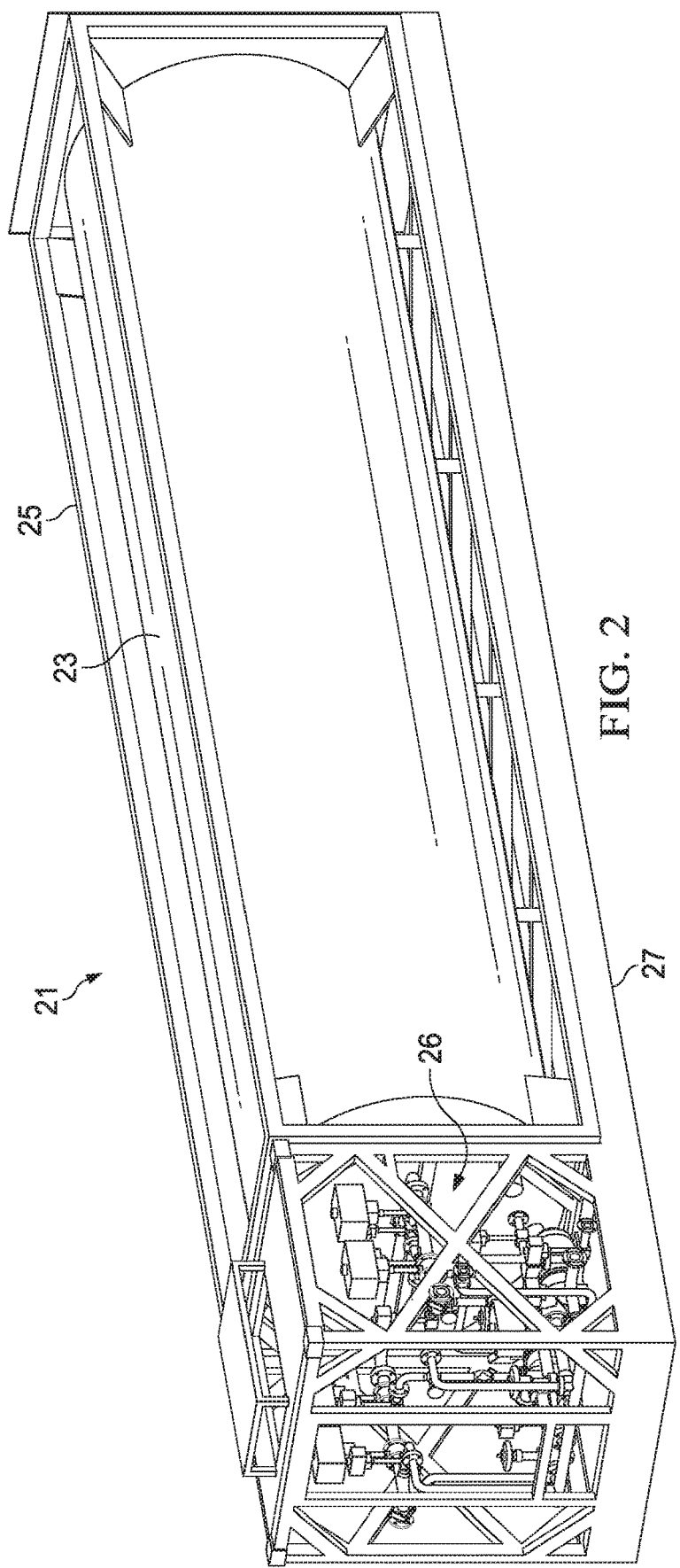
FIG. 2 is an isometric view of an embodiment of the fueling platform of FIG. 1 mounted to an embodiment of a skid.
Figure 3:
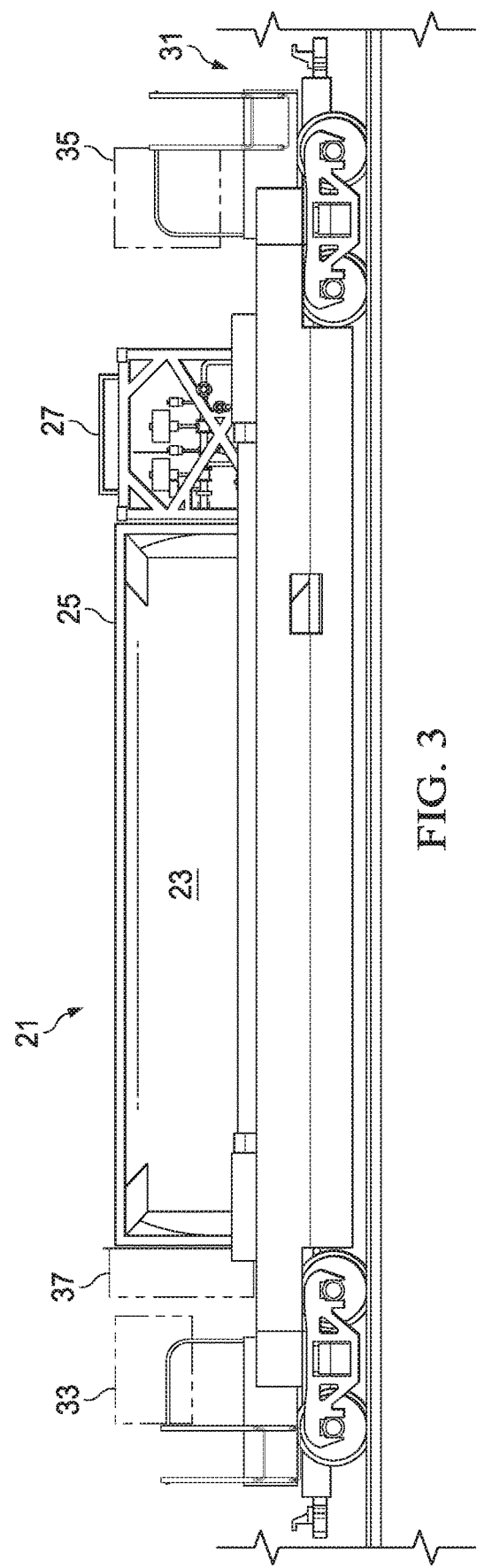
FIG. 3 is a side view of an embodiment of the skid-mounted fueling platform of FIG. 2 mounted to an intermodal well rail car.

As shown in FIG. 2, the platform 21 may be mounted to another portable support structure, such as a skid 27. Either the platform 21 or the skid 27 may include an intermodal footprint. Examples of the intermodal footprint may include standard lengths of 20, 40, 45, 48 or 53 feet. The platform 21, such as with skid 27, may be mounted to an intermodal well rail car 31 (FIG. 3). The platform 21 or the intermodal well rail car 31 may include a modular, on-board fuel dispensing system (e.g., fuel dispensing system 26), power 33, storage 35, lighting and compressed air 37 for the platform 21. Power, air, storage, and lighting may be provided from alternative sources on-site or a power unit may use LNG vapor from the storage vessels for fuel.

In some examples, the platform and/or the intermodal well rail car 31 include a generator and a compressor. The generator and the compressor can be configured to be powered with shore power. As used herein, the term "shore power" may be understood to mean providing electrical power from a land-based facility (e.g., shore) to a vessel at berth (e.g., a rail car that is stationary on a railroad in a rail yard), thereby allowing the device that was providing power to the vessel to be turned off. Examples of "the device" include a locomotive, a generator on the platform 21, etc.

Embodiments of the platform 21 (e.g., with or without skid 27) may be configured to be mounted to a trailer chassis 41 (FIG. 4) or a land-based installation 43. Each of the trailer chassis 41 and the land-based installation 43 may include a footprint that matches a footprint of the intermodal well rail car 31. Thus, the platform 21 is interchangeably mountable to and removable from any of these structures without directly handling the storage tank 23 or the fuel it may contain. Thus, the platform 21 may be configured to be in fluid communication with one or more on-site storage vessels to increase storage capacity, including mobile wheel-based storage devices or permanent land-fixed storage infrastructure.

Embodiments of the platform 21 may be configured to transfer fuel from or to the storage tank 23 with at least one of a pump or differential pressure transfer. For example, fuel can be transferred to a fuel tender 24 via the fuel dispensing system 26 from any of the following: storage tank 23, trailer chassis 41, land-based installation 43, etc. Fuel also can be transferred from the fuel tender 24 to any of the above items via the fuel dispensing system 26. In one example, the at least one pump may be configured to be submerged in fuel inside the storage tank 23 for pumping fuel from the storage tank 23. The at least one pump can be electrically or hydraulically powered. When the term "pump" is used herein, the pump may be situated in one or more of the following configurations:

(1) External to the storage vessel, requiring a "cool down period" before operation;

(2) External to the storage vessel, but within a vacuum insulated sump pump (such as in the fuel dispensing system 26), thereby eliminating the cool down requirement prior to pumping, yet offering maintenance benefits;

(3) Within and at the bottom of the storage vessel, within a pump well, such that the pump may extract a maximum amount of product compared to options (1) and (2); and/or (4) The system also has the flexibility to plumb in another external pump for redundancy.

In the case of LNG, cryogenic pumps are required. Cryogenic pumps that are not situated in cryogenic sumps require a cool down period before the pump is capable of pumping liquid. Otherwise, the relatively warm pump will cause LNG to vaporize and cause pump cavitation. The system may include a recirculation circuit to allow one or more pumps to pre-cool before pumping the LNG. For example, the platform 21 may include a cryogenic pump having a recirculation circuit configured to pre-cool the cryogenic pump before pumping. The recirculation circuit can be configured to return two-phase fuel to at least one of the storage tank 23 and the storage vessels. In another embodiment, the platform 21 may include a sump pump, which can be vacuum jacketed. In one example, the use of multiple electric drive or hydraulic drive pumps for redundancy can provide 150 to 200 gallons per minute.

Some embodiments may include a fuel dispensing system 26 with automatic controls and manual override (e.g., full manual backup operation) for interfacing or manifolding with the one or more storage vessels or other custody of transfer system. For example, the system may include valves actuated by an electronic control unit. A user of the system would make fluid connections and initiate an automated fueling event. The electronic control unit can notify the user when to remove the connections when the automated fueling event is complete. In addition, the electronic control unit can monitor fuel levels of the storage tank and the one or more storage vessels, including communication with the fuel tender regarding fuel levels. Thus, versions of the system may be configured to refuel one or more storage vessels. In one example, the system can simultaneously refuel two or more of the storage vessels.

Figure 5:
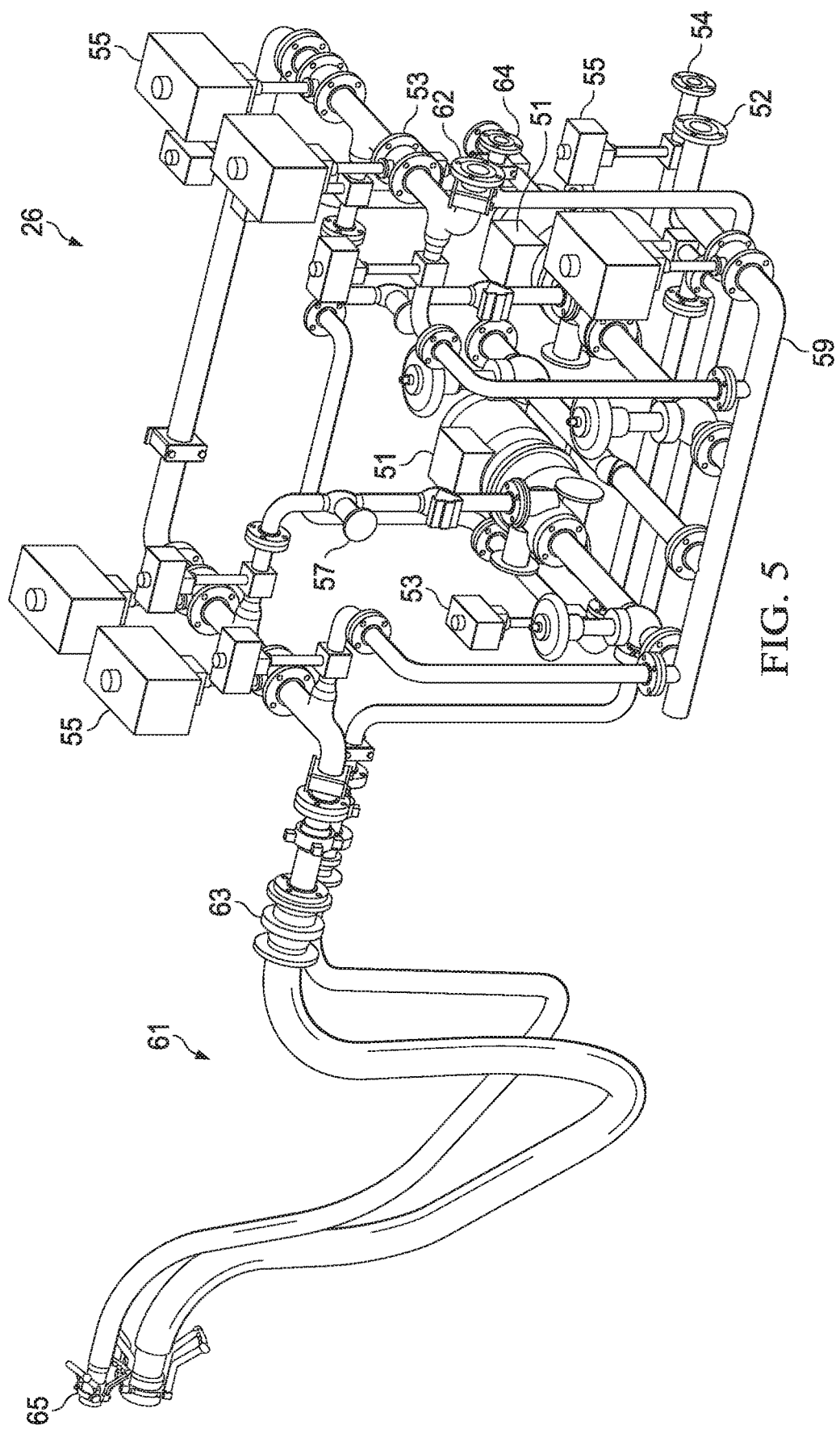
FIG. 5 is an isometric view of an embodiment of dispensing system for a fuel platform.
Figure 8:
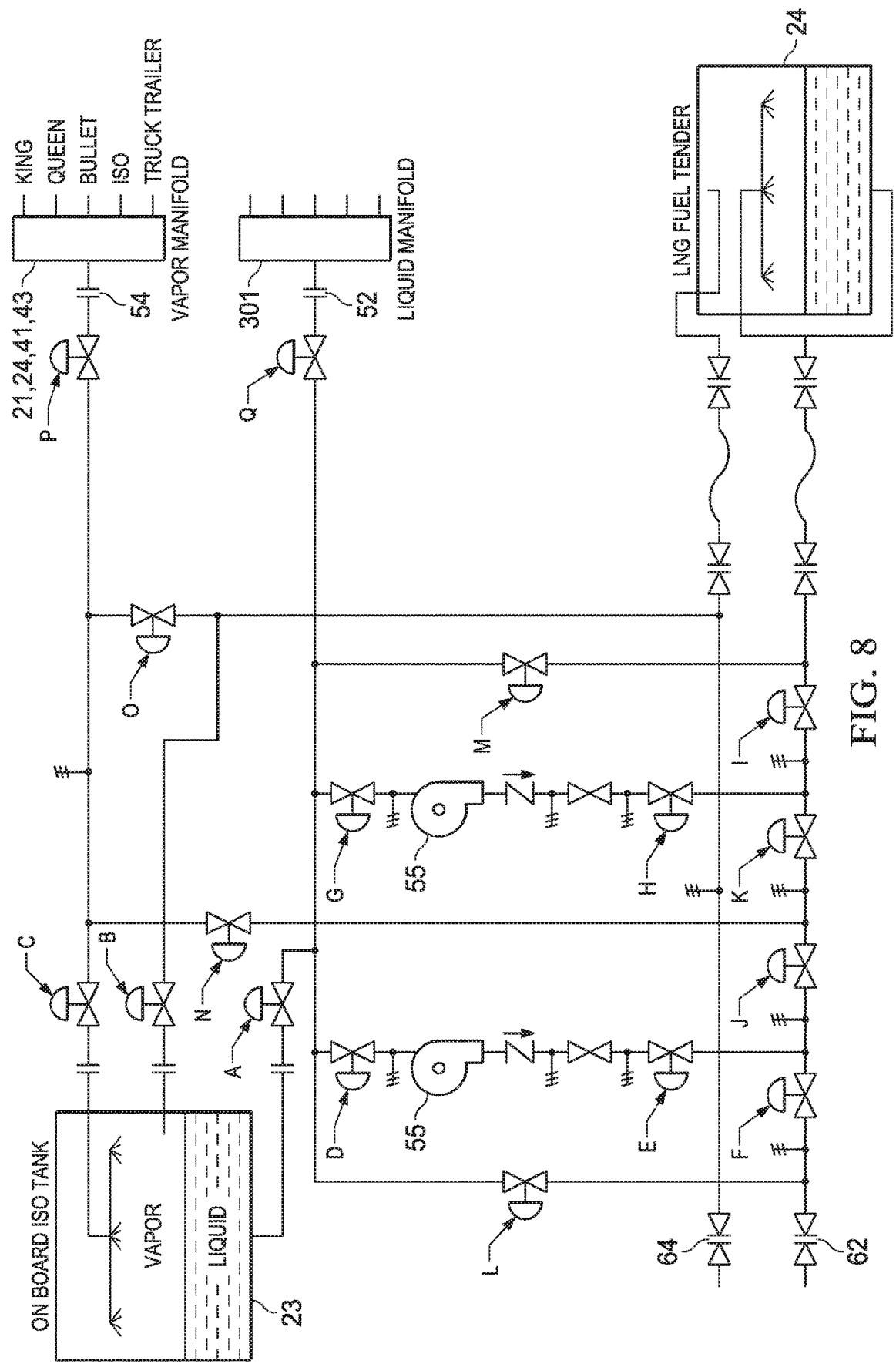
FIG. 8 is a schematic drawing of an embodiment of a fueling station.

FIG. 5 depicts an embodiment of the fuel dispensing system 26 including pumps 51, ball valves 53, valve actuators 55, manual valve 57 and manifold 59. As shown in FIGS. 5 and 8, a connection 52 (e.g., a flanged connection) may be used for liquid fluid communication to one or more additional storage units. A connection 54 (e.g., a flanged connection) may be used for vapor fluid communication to one or more additional storage units. Dispensing system 26 may further include a hose assembly 61 for handling at least one of vapors and liquids. Hose assembly 61 may include an optional safety break-away connector 63, and dry disconnect connections 65 for the receiving vehicle.

Figure 6:
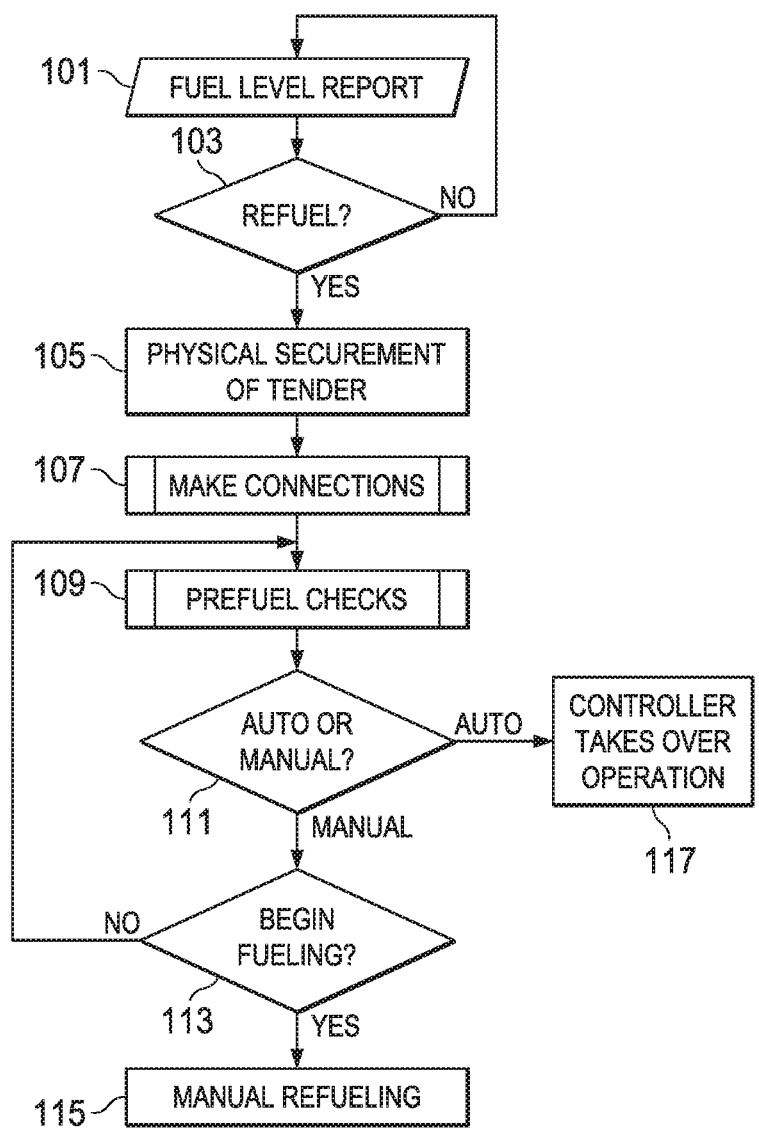
FIG. 6 is a flowchart of an embodiment of a refueling preparation sequence.

In one system operation, a refuel preparation sequence (FIG. 6) may include obtaining a fuel level report 101 from a storage vessel (e.g., a fuel tender) and determining whether to refuel 103 the storage vessel. If the storage vessel is to be refueled, securing the storage vessel 105 and make connections 107 to the storage vessel. Pre-fuel checks 109 are performed and a determination 111 is made whether to manually or automatically refuel the storage vessel. If manual refueling is selected, a determination 113 is made whether to begin fueling 115. If manual refueling is not begun, the operation returns to pre-fuel checks 109. If automated refueling is selected, the electronic control unit takes over 117 the automated fueling event.

In operation, embodiments of a method of LNG fueling may include providing a portable platform 21 having a cryogenic storage tank 23 with LNG fuel. The method may include mounting the portable platform 21 to a footprint of an intermodal well rail car 31, and providing at least one of power, storage, lighting or compressed air from the intermodal well rail car 31 to the portable platform 21. The method further includes delivering LNG fuel to one or more LNG storage vessels, such as fuel tender 24, a trailer 41, installation 43 or even another platform 21. The method may include handling LNG fuel in both a gaseous state and a liquid state. In addition, the method may further comprise providing at least one of an on-board dispensing system, power, storage, lighting or compressed air.

Some versions of the method may further comprise removing the portable platform 21 (with or without the skid 27) from the intermodal well rail car 31, and then mounting the portable platform 21 on a trailer chassis 41 or a land-based foundation 43, each having a footprint that matches the footprint of the intermodal well rail car 31.

Embodiments of the method may include pumping LNG fuel or differential pressure transfer of LNG fuel. The method may further comprise automating the delivery of LNG fuel and providing manual override and interfacing with the one or more LNG storage vessels or other custody of transfer system. In one example, the method includes the portable platform 21 instructing a user to make connections and initiate an automated fueling event, notifying the user to remove the connections when fueling is complete, and monitoring fuel levels of the cryogenic storage tank and the one or more LNG storage vessels. The method can include simultaneously fueling two or more of the LNG storage vessels. In addition, the method may further comprise pre-cooling a pump with a recirculation circuit before pumping, and returning two-phase LNG fuel to at least one of the cryogenic storage tank and the one or more LNG storage vessels.

Figure 7:
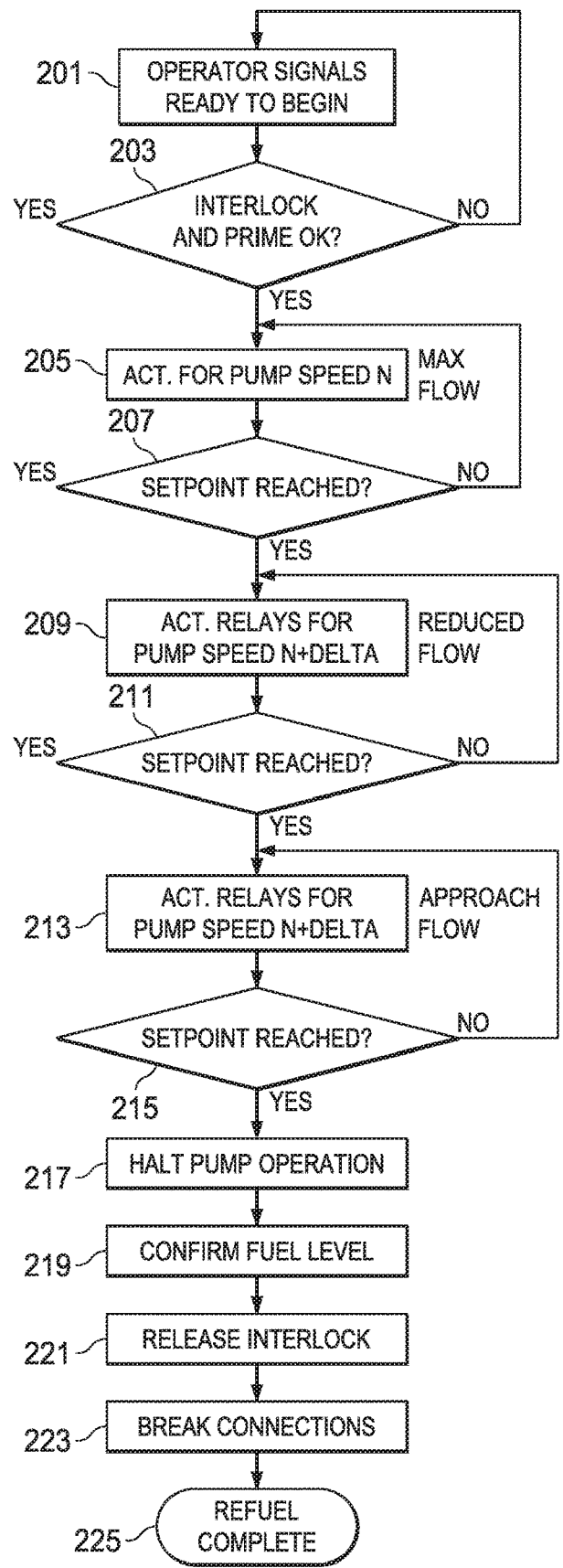
FIG. 7 is a flowchart of an embodiment of an automated refueling operation.

In a particular example of offloading LNG fuel, such as from tender to tender, tender to storage, etc., a pump interface may include a pump pre-cool sequence such as that depicted in FIG. 7. In one version, an operator signals ready to begin 201 and it is determined 203 whether interlock and prime are ready. If so, pump speed is actuated 205 until a set point is reached 207. Relays may be actuated 209 for a change in pump speed until a set point is reached 211. As the refuel level of the storage vessel nears completion, relays are actuated 213 until a set point is reached 215, and pump operation is halted 217. After the fuel level is confirmed 219, interlock is released 221, connections are undone 223 and refueling is complete 225.

FIG. 8 is a schematic drawing of an embodiment of a fueling station and may be referenced for procedures of various operations. Each operation may be performed automatically under the control of an electronic control unit, or manually by an operator.

For example, one version of a pump pre-cool sequence may be performed by admitting LNG to the on-board manifold 301 by opening valves A and Q. LNG is admitted to the inlets of pumps 55 by opening valves D and G. By closing valves F and I, and opening valves J, K, N, C, and P, two-phase LNG may be returned to one or more of the storage vessels 23, 21, 41, 43. After a sufficient cool-down time, the pumps 55 may be run to circulate LNG.

In an example of a refuel operation (and once the pump pre-cool is complete), liquid is admitted to the inlets of pumps 55 by opening valves C, Q, N, D, and G. Alternatively, D and G, and associated valves may be opened depending on whether a one pump or a two pump operation is desired. Flowing LNG is routed to the fuel tender 24 by opening valves E, H, J, K, and I. Hoses and dry disconnect fittings complete the connections to the fuel tender 24. The control system on the fuel tender 24 determines the use of a top-fill operation or a bottom-fill operation. Displaced vapor is returned by a vapor hose and dry disconnect fitting, and through open valves O, B, and P.

An offload of fuel from one fuel tender 24 to another fuel tender 24 may be required when a fuel tender must be emptied when preparing for major maintenance at a repair facility. In one embodiment of the operation, liquid and vapor hose connections are made to both tenders 24. Valves L and G are opened, admitting LNG to the inlet of a pump 55. Valves H and I are opened and the pump 55 is operated, which transfers LNG. In addition, connections 62, 64 (FIGS. 5 and 8) may be used for liquid and vapor fluid communications, respectively, to one or more additional storage units (e.g., such as another fuel tender 24).

An offload of fuel from a fuel tender to another storage vessel may be required for similar reasons. In an example of the operation, liquid and vapor hose connections are made to the fuel tender 24. Valves M, D, and G are opened, allowing LNG to the inlets of the pumps 55. Valves E, H, J, K, N, C, and P are opened allowing pumped liquid to return to storage. Valve B is opened for exchange of displaced vapor.

It is highly unlikely but possible for both pumps 55 on the platform 21 to fail. Under such circumstances, an external pump may be required. An external pump may be connected in the same manner as another tender, or in the same manner as another storage vessel. An external pump also may be connected to the flanged connection between valve Q and the liquid manifold 301. By opening valves M or L, LNG from an external pump may be conveyed to the fuel tender 24.

In another embodiment, all actuated valves may be operated manually by a user. Manual operation allows for operation in the event that automatic fueling is non-functional or the receiving vehicle is not equipped for automatic fueling, or for special situations outside the scope of normal fueling.

As disclosed herein, a mobile, modular platform can provide a testing and evaluation environment for new equipment without the financial commitment of a fixed installation. This novel refueling system for rail applications is capable of incrementally growing with LNG implementation in the rail industry. The portability of the system allows the fueling infrastructure to travel with the LNG locomotive and fuel tender to the specific locations where LNG fuel is needed. The modularity of the system allows the system to grow incrementally for increasing demand.

For example, a modular, mobile refueling system allows users to dispatch LNG fueling equipment to areas of the country where market conditions are most favorable, eliminating the financial risk associated with fixed installations. As LNG demand grows, storage can be augmented by the addition of extra storage modules. Additionally, the LNG refueling equipment market is not yet poised to deliver railroad-specific components, and refueling operators are still developing solutions for dispensing and measurement.

Other versions may include one or more of the following embodiments:

Embodiment 1. A system for portable, modular fueling, the system comprising:

a platform configured for intermodal rail transport, the platform having a storage tank for fuel and mounted to a frame, and the storage tank is configured to be in fluid communication with one or more storage vessels for fuel to deliver fuel thereto.

Embodiment 2. The system of any of these embodiments, wherein the system is configured to handle fuel in both a gaseous state and a liquid state.

Embodiment 3. The system of any of these embodiments, wherein the platform is configured to be mounted to an intermodal well rail car capable of providing a modular, on-board dispensing system, power, storage, lighting and compressed air.

Embodiment 4. The system of any of these embodiments, wherein the intermodal well rail car comprises an electrical generator and an air compressor.

Embodiment 5. The system of any of these embodiments, wherein the generator and the compressor are configured to be powered with shore power.

Embodiment 6. The system of any of these embodiments, wherein the platform is configured to be mounted to a trailer chassis or a land-based foundation, each having a footprint that matches a footprint of the intermodal rail transport.

Embodiment 7. The system of any of these embodiments, wherein the platform is configured to transfer fuel with at least one of a pump or differential pressure transfer.

Embodiment 8. The system of any of these embodiments, wherein the pump is configured to be submerged in fuel inside the storage tank.

Embodiment 9. The system of any of these embodiments, wherein the platform further comprises at least one pump for pumping fuel from the storage tank, and the pump is electrically or hydraulically powered.

Embodiment 10. The system of any of these embodiments, wherein the system comprises automatic controls with manual override for interfacing with the one or more storage vessels or other custody of transfer system.

Embodiment 11. The system of any of these embodiments, wherein the platform comprises valves actuated by an electronic control unit, wherein a user makes connections and initiates an automated fueling event, the electronic control unit notifies the user when to remove the connections, and the electronic control unit monitors fuel levels of the storage tank and the one or more storage vessels.

Embodiment 12. The system of any of these embodiments, wherein the fuel comprises one of liquid natural gas (LNG), compressed natural gas (CNG), diesel, gasoline, liquid hydrogen, liquid ethylene, propane, natural gas, heavy fuel oil, butane, ethane, acetylene, methanol, ethanol, diethyl ether or biodiesel.

Embodiment 13. The system of any of these embodiments, wherein the platform comprises a skid having an intermodal footprint of 20, 40, 45, 48 or 53 feet.

Embodiment 14. The system of any of these embodiments, wherein the storage vessels comprise at least one of a locomotive, fuel tender, a road vehicle, a marine vessel, a permanent or a land-fixed storage vessel, rubber-tired storage vessel, freight truck, passenger bus, light car, truck, mining truck or equipment or aircraft.

Embodiment 15. The system of any of these embodiments, wherein the system is contained in a footprint of one intermodal well rail car.

Embodiment 16. The system of any of these embodiments, wherein the storage tank comprises a 40 foot or 48 foot ISO cryogenic tank frame mounted to the platform.

Embodiment 17. The system of any of these embodiments, wherein the platform is configured to be in fluid communication with one or more on-site storage vessels to increase storage capacity, including mobile wheel-based storage devices or permanent land-fixed storage infrastructure.

Embodiment 18. The system of any of these embodiments, wherein the platform is configured to refuel one or more fuel tenders.

Embodiment 19. The system of any of these embodiments, wherein the platform is configured to simultaneously refuel two or more of the storage vessels.

Embodiment 20. The system of any of these embodiments, wherein the platform comprises a cryogenic pump having a recirculation circuit configured to pre-cool the cryogenic pump before pumping, and the recirculation circuit is configured return two-phase fuel to at least one of the storage tank and the storage vessels.

Embodiment 21. The system of any of these embodiments, wherein the platform comprises a sump pump.

Embodiment 22. The system of any of these embodiments, wherein the sump pump is vacuum jacketed.

Embodiment 23. An apparatus for portable, modular liquid natural gas (LNG) fueling, the apparatus comprising:

an intermodal well rail car having an intermodal foot print and configured to provide an on-board fuel dispensing system, power, storage, lighting and compressed air; and a platform contained in the intermodal foot print and mounted to the intermodal well rail car for intermodal rail transport, the platform having a cryogenic storage tank mounted to a frame, and the storage tank is configured to handle LNG in both gaseous and liquid states with one or more LNG storage vessels to deliver LNG fuel thereto.

Embodiment 24. A method of liquid natural gas (LNG) fueling, the method comprising:

(a) providing a portable platform having a cryogenic storage tank with LNG fuel;

(b) mounting the portable platform to a footprint of an intermodal well rail car;

(c) providing at least one of power, storage, lighting or compressed air from the intermodal well rail car to the portable platform; and then (d) delivering LNG fuel to one or more LNG storage vessels.

Embodiment 25. The method of any of these embodiments, wherein step (d) comprises handling LNG fuel in both a gaseous state and a liquid state.

Embodiment 26. The method of any of these embodiments, further comprising providing at least one of an on-board dispensing system, power, storage, lighting or compressed air.

Embodiment 27. The method of any of these embodiments, further comprising removing the portable platform from the intermodal well rail car, and then mounting the portable platform on a trailer chassis or a land-based foundation, each having a footprint that matches the footprint of the intermodal well rail car.

Embodiment 28. The method of any of these embodiments, wherein step (d) comprises pumping LNG fuel or differential pressure transfer of LNG fuel.

Embodiment 29. The method of any of these embodiments, further comprising automating step (d) and providing manual override and interfacing with the one or more LNG storage vessels or other custody of transfer system.

Embodiment 30. The method of any of these embodiments, wherein the portable platform further comprises instructing a user to make connections and initiate an automated fueling event, notifying the user to remove the connections when fueling is complete, and monitoring fuel levels of the cryogenic storage tank and the one or more LNG storage vessels.

Embodiment 31. The method of any of these embodiments, wherein step (d) comprises simultaneously fueling two or more of the LNG storage vessels.

Embodiment 32. The method of any of these embodiments, further comprising pre-cooling a pump with a recirculation circuit before pumping, and returning two-phase LNG fuel to at least one of the cryogenic storage tank and the one or more LNG storage vessels.

This written description uses examples to disclose the embodiments, including the best mode, and also to enable those of ordinary skill in the art to make and use the invention. The patentable scope is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

Note that not all of the activities described above in the general description or the examples are required, that a portion of a specific activity may not be required, and that one or more further activities may be performed in addition to those described. Still further, the order in which activities are listed are not necessarily the order in which they are performed.

In the foregoing specification, the concepts have been described with reference to specific embodiments. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of invention.

It may be advantageous to set forth definitions of certain words and phrases used throughout this patent document. The term "communicate," as well as derivatives thereof, encompasses both direct and indirect communication. The terms "include" and "comprise," as well as derivatives thereof, mean inclusion without limitation. The term "or" is inclusive, meaning and/or. The phrase "associated with," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, have a relationship to or with, or the like. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Also, the use of "a" or "an" are employed to describe elements and components described herein. This is done merely for convenience and to give a general sense of the scope of the invention. This description should be read to include one or at least one and the singular also includes the plural unless it is obvious that it is meant otherwise.

The description in the present application should not be read as implying that any particular element, step, or function is an essential or critical element that must be included in the claim scope. The scope of patented subject matter is defined only by the allowed claims. Moreover, none of the claims invokes 35 U.S.C. § 112(f) with respect to any of the appended claims or claim elements unless the exact words "means for" or "step for" are explicitly used in the particular claim, followed by a participle phrase identifying a function. Use of terms such as (but not limited to) "mechanism," "module," "device," "unit," "component," "element," "member," "apparatus," "machine," "system," "processor," or "controller" within a claim is understood and intended to refer to structures known to those skilled in the relevant art, as further modified or enhanced by the features of the claims themselves, and is not intended to invoke 35 U.S.C. § 112(f).

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims.

After reading the specification, skilled artisans will appreciate that certain features are, for clarity, described herein in the context of separate embodiments, may also be provided in combination in a single embodiment. Conversely, various features that are, for brevity, described in the context of a single embodiment, may also be provided separately or in any subcombination. Further, references to values stated in ranges include each and every value within that range.

What is claimed is:

1. A system for portable, modular fueling, the system comprising:
   a platform configured for intermodal rail transport and interchangeably mounted to and removable from an unenclosed skid without directly handling a storage tank of the platform, the platform having a frame and the storage tank for fuel;
   the unenclosed skid supporting the platform, the unenclosed skid configured to selectively couple to the storage tank or frame;
   a fuel dispensing system integral with the unenclosed skid and detachably coupled to the storage tank; and
   a cryogenic pump having a recirculation circuit configured to pre-cool the cryogenic pump before pumping, and the recirculation circuit is configured to return two-phase fuel to at least one of the storage tank and storage vessels,
   wherein the unenclosed skid is configured for releasable mounting on an intermodal rail transport vehicle having a generator and an air compressor, and the storage tank is configured to be in fluid communication with one or more of the storage vessels to deliver fuel,
   wherein the system is configured to simultaneously refuel two or more of the storage vessels.

2. The system of claim 1, wherein the system is configured to handle fuel in both a gaseous state and a liquid state.

3. The system of claim 1, wherein the system is configured to be interchangeably mounted to an intermodal rail transport vehicle comprising an intermodal well rail car capable of providing power, storage, lighting and compressed air.

4. The system of claim 1, wherein the system is configured to be interchangeably mounted to the intermodal transport vehicle comprising a trailer chassis or a land-based foundation, each having a footprint that matches a footprint of the intermodal rail transport vehicle.

5. The system of claim 1, wherein the system is configured to transfer fuel with at least one of a pump or differential pressure transfer.

6. The system of claim 5, wherein the pump is configured to be submerged in fuel inside the storage tank.

7. The system of claim 1, wherein the system further comprises at least one pump for pumping fuel from the storage tank, and the pump is electrically or hydraulically powered.

8. The system of claim 1, wherein the system comprises automatic controls with manual override for interfacing with the one or more storage vessels or other custody of transfer system.

9. The system of claim 8, wherein the system comprises valves actuated by an electronic control unit, wherein a user makes connections and initiates an automated fueling event, the electronic control unit notifies the user when to remove the connections, and the electronic control unit monitors fuel levels of the storage tank and the one or more storage vessels.

10. The system of claim 1, wherein the fuel comprises one of liquid natural gas (LNG), compressed natural gas (CNG), diesel, gasoline, liquid hydrogen, liquid ethylene, propane, natural gas, heavy fuel oil, butane, ethane, acetylene, methanol, ethanol, diethyl ether or biodiesel.

11. The system of claim 1, wherein the unenclosed skid has an intermodal footprint of 20, 40, 45, 48 or 53 feet.

12. The system of claim 1, wherein the storage vessels comprise at least one of a locomotive, fuel tender, a road vehicle, a marine vessel, a permanent or a land-fixed storage vessel, rubber-tired storage vessel, freight truck, passenger bus, light car, truck, mining truck or equipment or aircraft.

13. The system of claim 1, wherein the system is contained in a footprint of one intermodal well rail car.

14. The system of claim 1, wherein the storage tank comprises a 40 foot or 48 foot ISO cryogenic tank.

15. The system of claim 1, wherein the system is configured to be in fluid communication with one or more on-site storage vessels to increase storage capacity, including mobile wheel-based storage devices or permanent land-fixed storage infrastructure.

16. The system of claim 1, wherein the system is configured to refuel one or more fuel tenders.

17. An apparatus for portable, modular liquid natural gas (LNG) fueling, the apparatus comprising:
an intermodal well rail car having an intermodal foot print, wherein the intermodal well rail car is configured to provide on-board fuel dispensing, power, storage, lighting and compressed air;
a platform comprising:
a frame; and
a cryogenic storage tank mounted to the frame;
an unenclosed skid having an integrated LNG dispensing system, wherein the unenclosed skid is configured to releasably couple to the cryogenic storage tank or frame, wherein the platform is interchangeably mounted to and removable from the unenclosed skid without directly handling the cryogenic storage tank of the platform; and
a cryogenic pump having a recirculation circuit configured to pre-cool the cryogenic pump before pumping, and the recirculation circuit is configured to return two-phase fuel to at least one of the cryogenic storage tank and storage vessels,
wherein the LNG dispensing system is configured to selectively couple to the cryogenic storage tank to deliver LNG fuel;
wherein the platform and unenclosed skid are disposed within the intermodal foot print and releasably mounted to the intermodal well rail car for intermodal rail transport,
wherein the system is configured to simultaneously refuel two or more of the storage vessels.

* * * * *